Jan. 2, 1945.　　H. H. CARY ET AL　　2,366,489
GLASS ELECTRODE AND METHOD
Filed Aug. 2, 1940
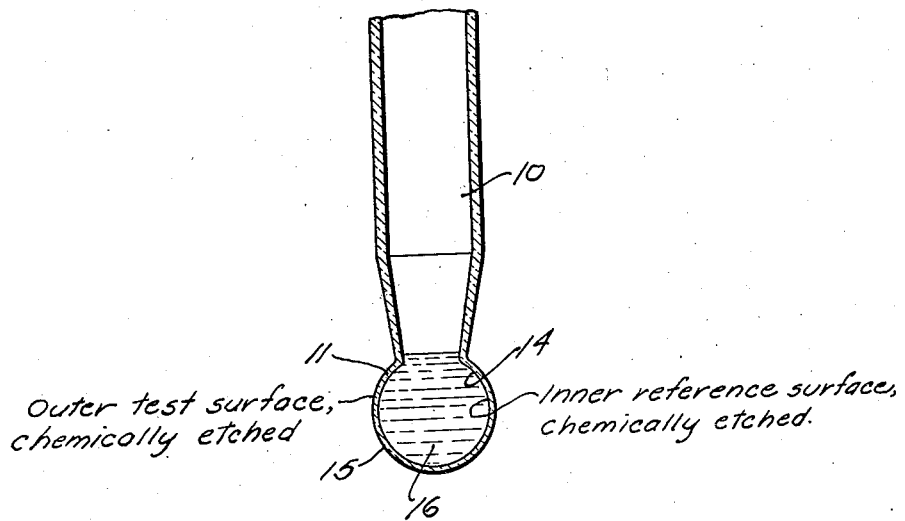
INVENTORS:
Henry H. Cary,
Warren P. Baxter,
BY HARRIS, KIECH, FOSTER & HARRIS,
Clarence F. Kiech
FOR THE FIRM
ATTORNEYS.

Patented Jan. 2, 1945

2,366,489

UNITED STATES PATENT OFFICE 2,366,489

GLASS ELECTRODE AND METHOD

Henry H. Cary, South Pasadena, and Warren P. Baxter, Pasadena, Calif., assignors to National Technical Laboratories, South Pasadena, Calif., a corporation of California Application August 2, 1940, Serial No. 349,858

26 Claims. (Cl. 204—195)

This invention relates to the measurement of pH by means of glass electrodes, and relates more particularly to a conditioning treatment for the electrode surfaces of a glass electrode.

As ordinarily constructed, a glass electrode consists of a thin bulb of special low resistance electrode glass blown on the end of a supporting tube composed of a glass having a high electrical resistance. When solutions of different pH are placed in contact with the inner and outer walls of the bulb and proper electrical precautions are taken, it is found that an electric potential difference exists between the two solutions. This potential difference varies with changes in pH of the inner and outer solutions and may be expressed by the following formula over a limited range of pH values:

$$E = A + (.00019832) T (pH_1 - pH_2)$$

Where E is the potential of the inner solution with respect to the outer, $pH_1$ is the pH of the outer solution which may be the solution to be tested, $pH_2$ is the pH of the inner solution which may be the reference solution, and T is the absolute temperature in degrees Kelvin. The term A in the above relation is a characteristic of the particular electrode used; it varies from electrode to electrode even under conditions of identical manufacture, and usually varies in a given electrode with age and usage. This term ranges in value from a few millivolts to twenty millivolts or more and is commonly referred to as the "asymmetry potential" of the electrode.

The observed potential E may be regarded as having its origin in the difference between a potential arising at the reference electrode surface which is in contact with the reference solution and a potential arising at the test electrode surface which is in contact with the test solution. Thus viewed, the asymmetry potential as represented by the term A is apparently related to differences in activity as between the reference and test electrode surfaces of the glass electrode.

The asymmetry potential of the glass electrode introduces a complication in practical pH measurement since it is necessary to evaluate it in some manner before the potential measurements of the electrode can be interpreted in terms of the pH of the solutions with which it is in contact. In practice, this usually is accomplished by calibrating the electrode against solutions of accurately known pH. This calibration must be repeated frequently since, as indicated, the asymmetry potential of an electrode usually changes with age.

With the commonly used electrode glasses, the change in asymmetry potential with age is quite slow at room temperature, rarely amounting to more than a few millivolts per month. However, at elevated temperatures the change is greatly accelerated and may amount to more than twenty millivolts per day in boiling solutions of dilute acid. Furthermore, as the aging progresses, the electrode becomes more and more sluggish in responding to changes in pH so that after a few days' boiling the usual electrode will not correctly indicate pH unless an undue time is allowed for it to come to equilibrium. In the past, when an electrode had reached a certain degree of sluggishness its usefulness was at an end and it was necessary to discard it. This has greatly hindered the application of the glass electrode in many industries where the pH measurements must be made on hot solutions and the replacement cost of the electrodes would therefore be prohibitive.

It is an object of the present invention to provide a method for conditioning a glass electrode whereby one or both electrode surfaces may be brought to or maintained at a basic level of activity and/or response, and whereby the asymmetry potential, sluggishness, and the deleterious effects of aging in general may be minimized or overcome. A further object is to reduce the errors of pH measurement arising from the aging of the glass electrode.

Another object is to provide glass electrodes of such low asymmetry potential that different electrodes may be interchanged without requiring recalibration.

A further object is to provide a method and apparatus for storing intermittently used glass electrodes to overcome the effects of usage and aging and to maintain the electrode in a continuously useful condition.

It is a further object to provide a glass electrode, particularly of the sealed type, in which the aging effects at the inner electrode surface are continuously and automatically minimized or suppressed.

Further objects and features will be apparent from the following detailed description.

The figure of the accompanying drawing is a vertical cross-sectional view of one embodiment of a glass electrode, including a body or supporting tube 10 on which is blown a thin bulb 11 of electrode glass providing an inner or reference surface 14 and an outer or test surface 15. The bulb 11 is shown as containing a reference solution 16 to which electrical connection is made by any suitable means known in the art, for example, by an electrode wire shaped and sealed in a manner similar to the showings of our Patent No. 2,256,733. The invention is applicable to various types and shapes of glass electrodes suitable for measurement of pH, the figure being merely exemplary.

The present invention, which offers a solution to the above-described difficulties and which permits the attainment of the stated objects, is based, in part, on our discovery that the sluggishness and asymmetry potential associated with an aged electrode may be removed by treating the electrode with an agent that will remove the surface layers of the electrode glass. We find that the chemical agents commonly employed to dissolve or etch glass will renew an aged glass electrode in a satisfactory manner. Thus, acid fluorides such as hydrofluoric acid or ammonium bifluoride will renew an aged electrode in a few minutes. For badly aged electrodes, we use the following procedure:

Using a paraffin lined beaker, a 15% solution of hydrofluoric acid is prepared by diluting the commercial 45% acid with two parts of water. A portion of the acid solution is poured into the electrode body and the bulb is immersed in the remainder of the solution so that etching takes place on the inner and outer surfaces of the bulb. After etching for approximately one minute, the electrode is rinsed in water and allowed to soak for a few hours in a dilute acid solution such as 0.1 N HCl to stabilize its characteristics. On testing, the electrode will then be found to have essentially zero asymmetry potential and to respond to pH changes with the same rapidity as a freshly made electrode. The figure of the accompanying drawing suggests, by legends, such chemically-etched reference and test surfaces resulting from internal and external contact of the electrode bulb 11 with a chemical etching agent capable of dissolving the glass of the bulb.

In some respects it is preferable to employ ammonium bifluoride instead of hydrofluoric acid as the etching agent. This salt is more convenient and less dangerous to handle than the hydrofluoric acid. Its action is somewhat slower, however, a 20% solution requiring about two minutes to etch the usual aged electrode.

It is to be noted that the amount of glass removed from the electrode by these procedures is quite small—it is insufficient to appreciably change the electrical resistance of a rugged glass electrode bulb—and therefore this renewal process may be repeated many times on the same electrode. However, the electrode bulb should be well annealed if many renewals are to be made, as otherwise the release of surface strains by the etching may cause the bulb to break.

In addition to the feature of renovating aged electrodes, our invention further extends to the maintenance of an electrode in good condition. When a glass electrode is only in intermittent use, this feature of maintenance may be realized by storing the electrode in an etching solution that is very slow in its action. By proper choice of solution the etching may be made to take place at about the same rate as the aging and thereby maintain the electrode in a continuously serviceable condition. For this purpose we find advantageous a dilute solution of a non-etching acid saturated with a slightly soluble fluoride salt, for example, a solution containing 0.1 N hydrochloric acid and an excess of solid calcium fluoride. The calcium fluoride, being only slightly soluble, continuously maintains a minute concentration of hydrofluoric acid in the solution. At this low hydrofluoric acid concentration etching takes place very slowly, only slightly faster than the rate of aging of the glass. By adding a soluble calcium salt, like calcium acetate, to the solution or by reducing the hydrochloric acid concentration, the action may be made even slower. Conversely, by employing more soluble fluorides, such as barium fluoride, more rapid action may be obtained.

A slow etching action may also be obtained with alkaline solutions. We find that alkaline solutions, such as alkali metal hydroxides or carbonates, have an etching action on glass, and that these solutions also act slowly to renew aged glass electrodes. The rate of etching appears to depend mainly on the pH of the solution, and decreases with decreasing pH. At a pH of about 9.5 the etching action occurs at a rate only slightly greater than the rate of aging. When stored in solutions of this pH, glass electrodes show no appreciable change in asymmetry potential even at elevated temperatures.

Alkaline solutions are particularly useful for storing and renewing electrodes that are to be used mainly for measuring the pH of alkaline solutions. Besides preventing the formation of asymmetry potentials, the alkaline storage solution conditions the electrode so that it rapidly attains equilibrium when pH measurements are made in other alkaline solutions. We prefer a borate buffer of pH 10 as an alkaline solution in which to store electrodes; however, we find that satisfactory freedom from asymmetry potential formation may be had in any solution above pH 8.0.

Solutions having a pH value above 11.0 have a relatively rapid etching action and such solutions may be used for reconditioning aged electrodes. Thus, a 1 normal sodium hydroxide solution will reduce the asymmetry potential of a badly aged electrode to a low value in about four days at room temperature.

A further important feature of our invention arises from our discovery that the same etching agents as described above will also reduce the relatively small asymmetry potential of freshly made glass electrodes to zero. Although the asymmetry potential of a freshly made electrode may only be a few millivolts, it is large enough to be troublesome in manufacture, since it necessitates calibrating individual electrodes before use. Electrodes treated with an etching agent are made interchangeable and the preliminary calibration before use is made unnecessary.

Certain benefits may be realized by the subjection of but one electrode surface to the conditioning treatment herein described. Thus, in the usual electrode, a filling solution of constant composition and pH is used inside the electrode and the solution whose pH is to be determined is placed on the outside of the electrode. Since the inner surface of the electrode is always exposed to the same pH, sluggishness of response is of no consequence at the inner surface, and satisfactory performance as regards rapidity of response may be obtained from aged electrodes by etching the outside surface only. In general, this procedure does not reduce the asymmetry potential to zero; in fact, it usually increases it as the usual tendency is for the contributions of the two surfaces to the asymmetry potential to balance each other. In consequence, etching one surface only will not eliminate the need for a calibration, but it will improve the speed of response of the electrode to solutions in contact with its etched surface.

In many commercial glass electrodes, the internal solution is permanently sealed in place, as, for example, in the electrode described in our patent mentioned above. In such cases it is almost impossible to open the electrode to permit treatment of the inner surface of the electrode glass with etching solution. Electrodes of this construction may be renewed when sluggish by etching the outside surface only. However, as explained above, this procedure usually does not reduce the asymmetry potential to zero as the contribution to the asymmetry potential associated with the inner surface of the electrode remains unaffected. In order to keep the inner surface of the electrode at a basic level of activity corresponding to that of a freshly etched surface we employ a filling solution compounded to have a slow etching action and with this modification the asymmetry potential of the electrode as a whole may be reduced to zero at any desired time simply by etching the outer surface. It will be apparent that with this combination the electrode may be completely renovated as regards both sluggishness and asymmetry potential, or may be maintained continuously serviceable during storage, without the necessity of breaking the seal.

An acid filling solution having a slow etching action may be made by using slightly soluble fluorides as described in connection with the storage of glass electrodes. For example, the filling solution may consist of 0.1 N hydrochloric acid saturated with calcium fluoride, the electrical connection to the solution being made by means of a sealed-in silver-silver chloride electrode. However, such solutions are not entirely satisfactory for this purpose since the acid concentration changes slowly as the etching proceeds and the filling solution cannot be depended upon to maintain a constant pH over a long period of time as is necessary if recalibration is to be avoided.

In permanently sealed glass electrodes, we prefer to use an alkaline solution to obtain the etching action. As mentioned previously, electrode aging takes place very slowly, if at all, when the pH is above 8.0. Furthermore, we find that the pH of the etching solution in contact with the glass will not change appreciably if its pH is in the vicinity of 9.5 so that a solution in this pH range has the desirable characteristics of a slow etching action and a stable pH. Although the pH of 9.5 appears to be optimum, the particular value used for the filling solution does not seem to be critical and satisfactory results in suppressing aging are obtainable with solutions having a range of pH values extending from 11.0 to 8.0 or lower.

In accordance with these principles we have constructed glass electrodes similar to those described in our patent mentioned above in which the filling solution was a borate buffer of pH 9.2 containing potassium chloride in a concentration of 0.25 mol per litre, electrical connection to the solution being made by means of a sealed-in silver-silver chloride electrode. Tests demonstrated that inappreciable aging occurred at the inner surface of the glass electrode and that the pH of the filling solution remained essentially constant even after long exposure to elevated temperatures.

It will be understood that the details of the above description are intended as exemplary rather than limiting, and various modifications will be apparent to one skilled in the art as embodying the essence of our invention as defined by the scope of the appended claims.

We claim as our invention:

1. A method of manufacture of glass membrane electrodes requiring no initial calibration for asymmetry potential, which includes the step of: contacting both surfaces of the electrode membrane with a chemical etching agent capable of dissolving the glass of said membrane, while maintaining said contact for a period of time sufficient to remove a very thin superficial layer of glass from the membrane; and removing said etching agent from contact with said membrane before the etching action has appreciably changed the electrical resistance of said membrane and when the asymmetry potential of the membrane has been reduced substantially to zero.

2. A method of renovating an aged glass electrode, which electrode has a relatively high asymmetry potential which has increased because of use, to reduce said asymmetry potential substantially to zero, and which glass electrode has two electrode surfaces, which method includes the steps of: contacting said two electrode surfaces with a chemical etching agent capable of dissolving the glass of said electrode; and maintaining said contact between said chemical etching agent and each of said surfaces only for a period of time sufficient to dissolve a superficial layer of said glass from each of said surfaces and insufficient to dissolve such large quantities of glass as would produce a substantial decrease in the electrical resistance of said electrode, said period of contact being sufficient to reduce the asymmetry potential of said glass electrode substantially to zero.

3. A method for preventing aging of a glass electrode subject to intermittent use and for maintaining said electrode in good condition, which method includes the steps of: storing between uses a glass electrode, which has the inner surface thereof chemically etched, in a solution of a chemical etching agent capable of dissolving superficial layers of glass from the outer surface of said electrode, the strength of said etching solution being adjusted with reference to the rate of aging to remove glass from said surface at a rate not substantially greater than necessary to prevent substantial aging.

4. A method as defined in claim 3, in which the storage solution is an alkaline solution having a pH between about 8 and 11.

5. A method as defined in claim 3, in which the storage solution is a dilute solution of a non-etching acid saturated with a slightly soluble fluoride salt.

6. A method of preventing aging of a glass electrode having a reference surface and a test surface, which method includes the steps of: maintaining said reference surface continuously in contact with a reference solution consisting of a chemical etching solution of such composition and strength as to slowly etch said reference surface by dissolving glass therefrom and of such composition and strength that such etching takes place at substantially the same rate as said aging to suppress said aging and maintain said reference surface at a basic level of activity which is substantially constant from time to time; and periodically contacting said test surface with a chemical etching agent capable of dissolving glass, while maintaining said contact between said chemical etching agent and said test surface only for a period of time sufficient to dissolve a superficial layer of said glass from said test surface and to reduce the asymmetry potential of said electrode substantially to zero.

7. A method as defined in claim 6, in which said reference solution is an alkaline solution having a pH between about 8 and 11.

8. A method as defined in claim 6, in which said reference solution is buffered at a pH of approximately 9.5.

9. A method as defined in claim 6, in which said reference solution is a dilute non-etching acid saturated with a slightly soluble fluoride salt.

10. A glass electrode having low-aging characteristics, which electrode includes in combination: a glass electrode bulb providing an inner reference surface and an outer test surface; and a reference solution in contact with said reference surface and comprising a chemical etching solution capable of slowly dissolving glass from said reference surface, said chemical etching solution being of such composition and strength that said etching takes place at about the same rate as the aging of said electrode.

11. A glass electrode of substantially zero asymmetry potential and which will respond rapidly when immersed in solutions to be tested, said glass electrode including in combination: a glass electrode bulb providing an inner reference surface and an outer test surface; and a reference solution in contact with said reference surface and comprising a chemical etching solution capable of slowly dissolving glass from said reference surface, said chemical etching solution being of such composition and strength that said etching takes place at about the same rate as the aging of said electrode, said outer test surface being chemically etched in sufficient amount to bring the asymmetry potential of said electrode substantially to zero.

12. A glass electrode as defined in claim 11, in which said reference solution is a dilute non-etching acid saturated with a slightly soluble fluoride salt.

13. A combination as defined in claim 11, in which said reference solution consists substantially of 0.1 N hydrochloric acid saturated with calcium fluoride.

14. A combination as defined in claim 11, in which the reference solution is alkaline and has a pH of approximately 9.5, whereby said reference surface is slowly etched while the pH of the reference solution remains substantially constant.

15. A combination as defined in claim 11, in which the reference solution is alkaline and has a pH within the range of substantially 8 to 11, said reference solution containing a buffer acting to maintain the pH of the reference solution substantially constant within said pH range of substantially 8 to 11.

16. A glass electrode providing an inner reference surface and an outer test surface and having substantially zero asymmetry potential, which glass electrode includes a glass membrane chemically-etched on both said reference and test surfaces in sufficient degree to reduce the asymmetry potential substantially to zero.

17. The method of producing a glass electrode which has substantially zero asymmetry potential, which method comprises: subjecting a glass electrode, which has one surface thereof chemically etched, to an etching operation comprising contacting the other surface of said electrode with a chemical etching agent to remove a superficial layer of the glass of said other surface so as to reduce the asymmetry potential of said glass electrode to substantially zero.

18. The method of reducing the asymmetry potential of a glass electrode to substantially zero, which comprises: subjecting a glass electrode, which has the inner surface thereof chemically etched, to an etching operation comprising contacting the outer surface of said electrode with a chemically etching agent to remove a superficial layer of the glass of said outer surface so as to reduce the asymmetry potential of said glass electrode to substantially zero.

19. The method of reducing the asymmetry potential of a glass electrode to substantially zero, which comprises: contacting one surface of said electrode with a chemical etching agent to remove a layer of glass from said surface; and contacting the other surface of said glass electrode with a chemical etching agent to remove a superficial layer of the glass of said other surface so as to reduce the asymmetry potential of said glass electrode to substantially zero.

20. The method of renovating an aged glass electrode, which electrode is sluggish in action because of use, which method includes the step of: subjecting a glass electrode, which has one surface thereof chemically etched, to an etching operation comprising contacting the other surface of said electrode with a chemical etching agent to remove a superficial layer of the glass of said other surface so as to reactivate said electrode and reduce the asymmetry potential of said glass electrode to substantially zero.

21. A method as defined in claim 18 in which the chemical etching agent is an alkaline solution having a pH between about 8 and about 11.

22. A method as defined in claim 18 in which the chemical etching agent is an ammonium bifluoride solution.

23. A method as defined in claim 18 in which the chemical etching agent is an acid fluoride solution.

24. A method as defined in claim 20 in which the chemical etching agent is an alkaline solution having a pH between about 8 and about 11.

25. A method as defined in claim 20 in which the chemical etching agent is an ammonium bifluoride solution.

26. A method as defined in claim 20 in which the chemical etching agent is an acid fluoride solution.

HENRY H. CARY.
WARREN P. BAXTER.